United States Patent
Zhang et al.

(10) Patent No.: US 10,681,344 B2
(45) Date of Patent: Jun. 9, 2020

(54) SYSTEM AND METHOD FOR MURA DETECTION ON A DISPLAY

(71) Applicant: Samsung Display Co., Ltd., Yongin-si, Gyeonggi-do (KR)

(72) Inventors: Yiwei Zhang, San Jose, CA (US); Janghwan Lee, Pleasanton, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/909,893

(22) Filed: Mar. 1, 2018

(65) Prior Publication Data

US 2019/0191150 A1    Jun. 20, 2019

Related U.S. Application Data

(60) Provisional application No. 62/599,249, filed on Dec. 15, 2017.

(51) Int. Cl.
*G09G 3/00* (2006.01)
*H04N 17/04* (2006.01)
*G06T 7/00* (2017.01)

(52) U.S. Cl.
CPC ........... *H04N 17/04* (2013.01); *G06T 7/0004* (2013.01); *G09G 3/006* (2013.01); *G06T 2207/20081* (2013.01); *G06T 2207/30121* (2013.01); *G09G 2320/0233* (2013.01); *G09G 2360/145* (2013.01)

(58) Field of Classification Search
CPC .................... G06K 9/00711; G09G 2320/0233
See application file for complete search history.

(56) References Cited

U.S. PATENT DOCUMENTS

| | | | |
|---|---|---|---|
| 5,917,935 A | | 6/1999 | Hawthorne et al. |
| 6,154,561 A | * | 11/2000 | Pratt ........................ G06T 7/001 |
| | | | 345/904 |
| 7,443,498 B2 | * | 10/2008 | Yoshida .................... G03F 1/84 |
| | | | 356/237.5 |
| 8,145,008 B2 | | 3/2012 | Chen et al. |
| 8,368,750 B2 | | 2/2013 | Mori et al. |

(Continued)

FOREIGN PATENT DOCUMENTS

| KR | 10-2014-0073259 | 6/2014 |
|---|---|---|
| KR | 10-1608843 | 4/2016 |

OTHER PUBLICATIONS

Chen, Shang-Liang et al., "TFT-LCD Mura Defect Detection Using Wavelet and Cosine Transforms", Journal of Advanced Mechanical Design, Systems, and Manufacturing, 2008, pp. 441-453, vol. 2, No. 3.

(Continued)

*Primary Examiner* — Paulos M Natnael
(74) *Attorney, Agent, or Firm* — Lewis Roca Rothgerber Christie LLP

(57) ABSTRACT

A system and method for white spot Mura defects on a display. The system is configured to pre-process an input images to generate a plurality of image patches. A feature vector is then extracted for each of the plurality of image patches. The feature vector includes at least one image moment feature and at least one texture feature. A machine learning classifier then determines the presence of a defect in each patch using the feature vector.

21 Claims, 8 Drawing Sheets

(56) References Cited

U.S. PATENT DOCUMENTS

| | | | | |
|---|---|---|---|---|
| 8,743,215 | B1* | 6/2014 | Lee | G09G 3/006 |
| | | | | 348/180 |
| 9,129,374 | B2 | 9/2015 | Xu | |
| 9,275,442 | B2 | 3/2016 | Ivansen et al. | |
| 9,633,609 | B2 | 4/2017 | Kao et al. | |
| 10,054,821 | B2* | 8/2018 | Jing | H04N 5/33 |
| 2005/0007364 | A1 | 1/2005 | Oyama et al. | |
| 2005/0210019 | A1* | 9/2005 | Uehara | G06F 17/30256 |
| 2005/0271262 | A1* | 12/2005 | Yoshida | G03F 1/84 |
| | | | | 382/149 |
| 2012/0148149 | A1* | 6/2012 | Kumar | G06K 9/00711 |
| | | | | 382/162 |
| 2013/0100089 | A1 | 4/2013 | Xu et al. | |
| 2013/0315477 | A1* | 11/2013 | Murray | G06F 17/30265 |
| | | | | 382/159 |
| 2014/0225943 | A1 | 8/2014 | Shiobara et al. | |
| 2016/0012759 | A1* | 1/2016 | Kim | G01N 21/956 |
| | | | | 345/89 |
| 2016/0140917 | A1 | 5/2016 | Hyung et al. | |
| 2017/0122725 | A1* | 5/2017 | Yeoh | G01B 11/14 |
| 2017/0124928 | A1* | 5/2017 | Edwin | G01B 11/14 |
| 2018/0301071 | A1* | 10/2018 | Zhang | G09G 3/006 |

OTHER PUBLICATIONS

European Patent Office Search Report, dated Apr. 25, 2019, for Patent Application No. 18212811.6, 10 pages.
Guo, LongYuan et al.; Sub-Pixel Level Defect Detection Based on Notch Filter and Image Registration, Article, International Journal Pattern Recognition Artificial Intelligence, vol. 32, No. 6, World Scientific Publishing Company, Dec. 21, 2017, 15 pages.
Sindagi, Vishwanath A. et al., "OLED Panel Defect Detection Using Local Inlier-Outlier Ratios and Modified LBP", 14th IAPR International Conference on Machine Vision Applications, Miraikan, Tokyo, Japan, May 18-22, 2015, pp. 214-217, MVA Organization.
U.S. Appl. No. 15/978,045, filed on May 11, 2018.
U.S. Office Action dated Jul. 11, 2019, for U.S. Appl. No. 15/978,045, 8 pages.
Wei, Zhouping, et al., "A median-Gaussian filtering framework for Moire pattern noise removal from X-ray microscopy image", CIHR—Canadian Institutes of Health Research, Micron, Feb. 2012, 7 pages.
Zhang, Yu et al.; Fabric Defect Detection and Classification Using Gabor Filters and Gaussian Mixture Model, Article, Asian Conference on Computer Vision, ACCV, 2009, pp. 635-644.

* cited by examiner

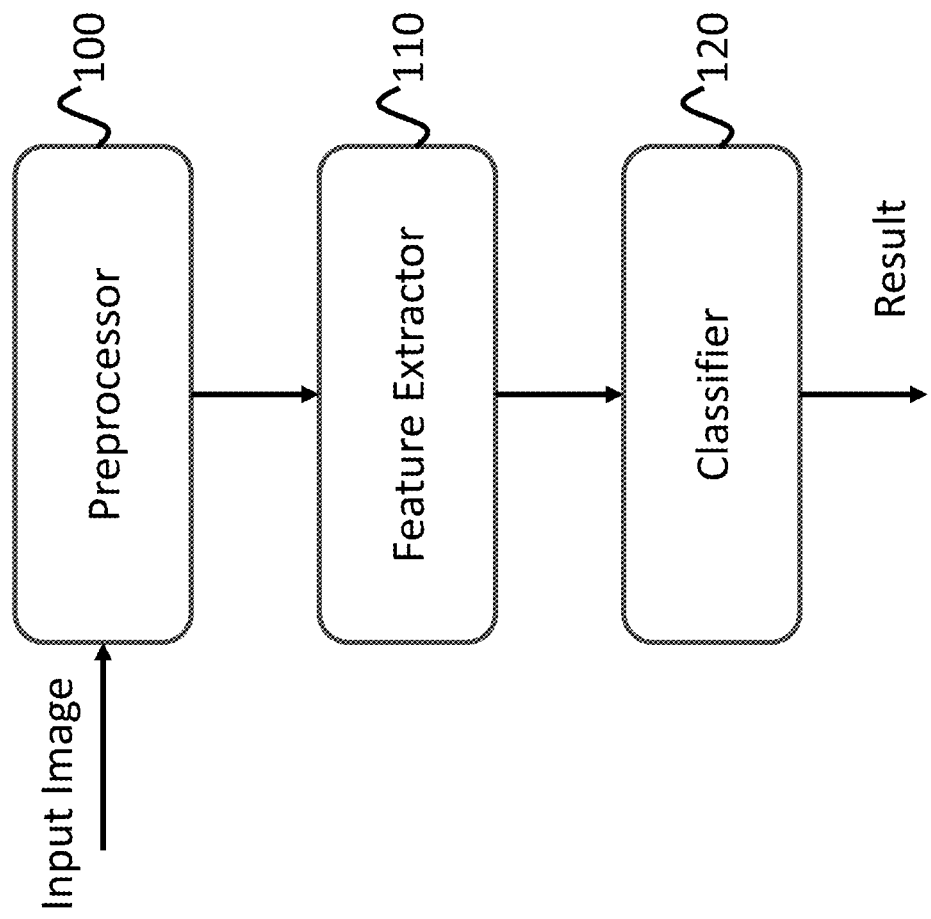

SYSTEM AND METHOD FOR MURA DETECTION ON A DISPLAY

CROSS-REFERENCE TO RELATED APPLICATION(S)

The present application claims priority to, and the benefit of, U.S. Provisional Patent Application No. 62/599,249, filed on Dec. 15, 2017, the contents of which are incorporated herein by reference in its entirety.

BACKGROUND

1. Field

Some embodiments of the present disclosure relate generally to a display defect detection system.

2. Description of the Related Art

As display resolutions and pixel densities have increase, the difficulty in performing defect detection has also increased. Manual defect detection is too time consuming for modern manufacturing facilities, while automated inspection techniques are often ineffective. For example, in automated surface inspection, defects in uniform (e.g. non-textured) surfaces can be easily identified when the local anomalies have distinct contrasts from their regular surrounding neighborhood. Defects in the low-contrast images, however, are extremely difficult to detect when the defects have no clear edges from their surroundings and the background presents uneven illumination.

One common type of display defect is "Mura." Mura is a large category of defects that have a local brightness non-uniformity. Mura can be roughly classified as line Mura, spot Mura, and region Mura depending on the size and general shape of the Mura. Each type of Mura may not have distinct edges and may not be readily apparent in images. Thus, identifying Mura using an automated testing system has proved difficult in the past. A new method of identifying Mura defects is therefore needed.

The above information is only for enhancement of understanding of the background of embodiments of the present disclosure, and therefore may contain information that does not form the prior art.

SUMMARY

Some embodiments of the present disclosure provide a system and method for Mura defect detection in a display. In various embodiments, the system includes a memory and a processor that is configured to identify display defects. In various embodiments, the system pre-processes an input image to generate a plurality of image patches. A feature vector may be extracted for each of the plurality of image patches. In various embodiments, each feature vector includes at least one image moment feature and at least one texture feature. The image patches are classified based on the presence of a defect by providing the feature vector for each image patch to a machine learning classifier.

In various embodiments, generating a plurality of image patches includes identifying at least one local maxima candidate in the input image, adding each identified local maxima candidate to a candidate list, and generating an image patch for each local maxima in the candidate list, where each image patch is centered at the corresponding local maxima candidate.

In various embodiments, generating a plurality of image patches further includes filtering local maxima candidates in the candidate list by removing each local maxima candidate from the candidate list when the local maxima candidate has a value less than a noise tolerance threshold.

In various embodiments, generating a plurality of image patches further includes dividing the input image into a plurality of areas, identifying a maximum local maxima in each area of the plurality of areas, and removing all local maxima from the local maxima list except for each maximum local maxima.

In various embodiments, the machine learning classifier may be a support vector machine.

In various embodiments, the at least one texture feature may be at least one of a correlation Gray-Level Co-Occurrence Matrix (GLCM) or a contrast GLCM.

In various embodiments, the at least one image moment comprises at least one of a mu 30 moment, hu 1 moment, or a hu 5 moment.

In various embodiments, pre-process the input image may further include performing Gaussian smoothing on the input image and normalizing the smoothed input image by mapping a dynamic range of the smoothed input image to an expected range.

In various embodiments, the defect, may be a white spot Mura defect.

BRIEF DESCRIPTION OF THE DRAWINGS

Some embodiments can be understood in more detail from the following description taken in conjunction with the accompanying drawings, in which:

FIG. 1A depicts a system overview according to various embodiments of the present invention;

DETAILED DESCRIPTION

Figure 1B:
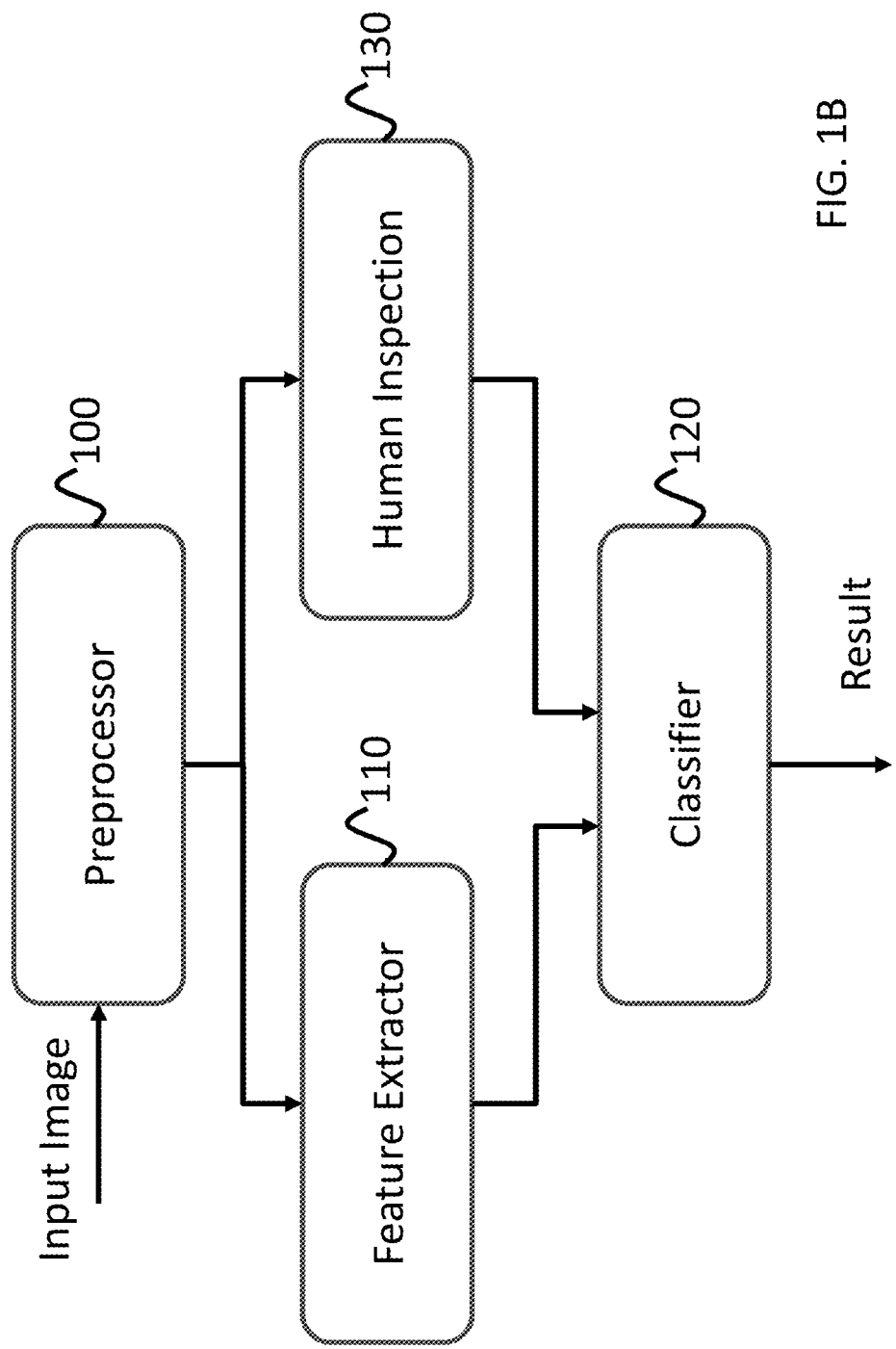
FIG. 1B depicts a system overview for training the classifier according to various embodiments of the present invention.

Features of the inventive concept and methods of accomplishing the same may be understood more readily by reference to the following detailed description of embodiments and the accompanying drawings. Hereinafter, embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

In the following description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Embodiments of the present invention include a system and method for Mura detection on a display. In various embodiments, the system receives an input image of a display showing a test image. The received input image may be divided into image patches. In various embodiments, the system may preprocess the image to identify defect candidates and generates the image patches based on the locations of the defect candidates. Features may be extracted from each of the image patches and provided to a machine learning classifier that determines if the image includes a defect (e.g. white spot Mura).

Figure 2:
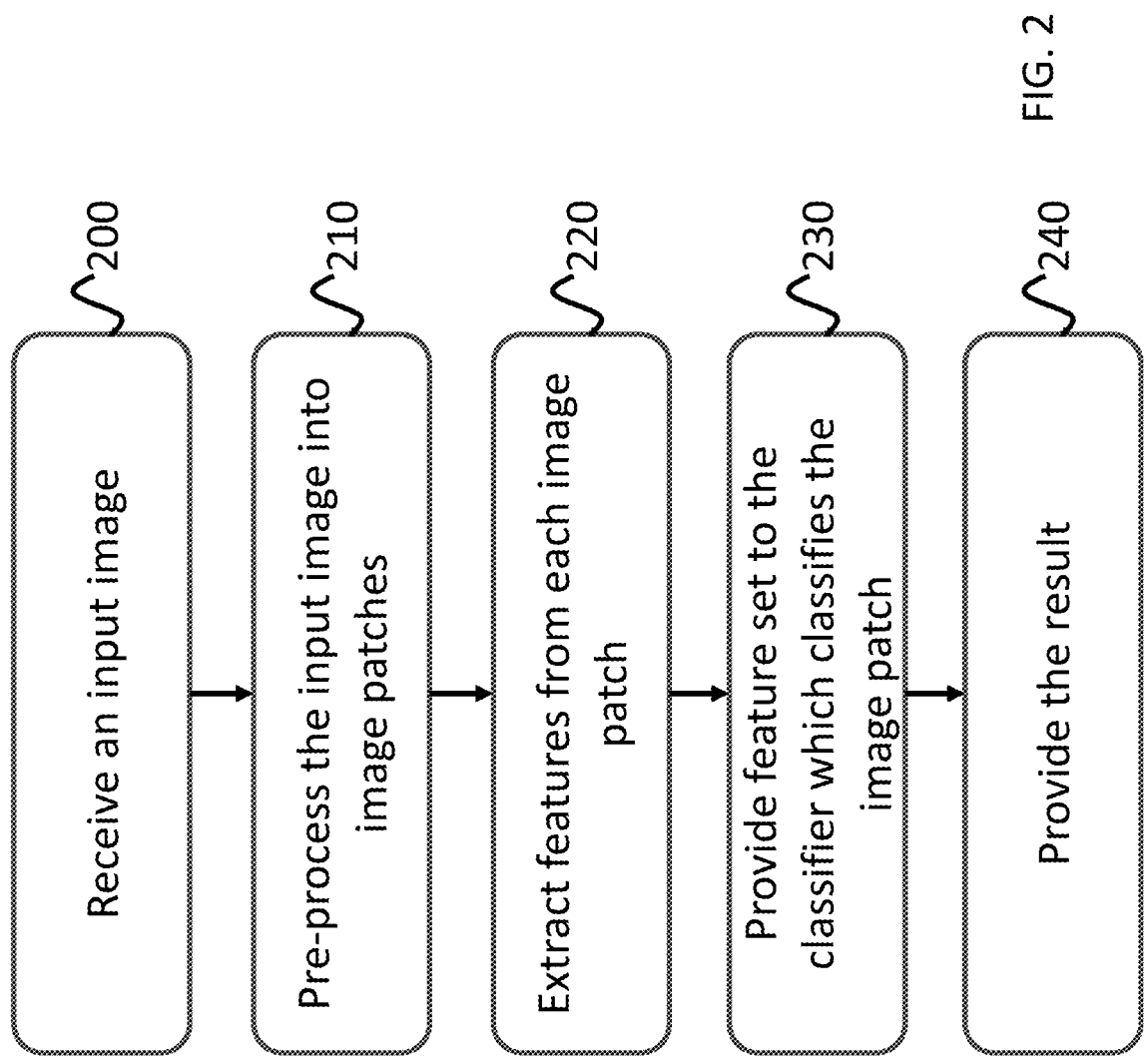
FIG. 2 depicts a method of classifying images according to various embodiments of the present invention.

FIG. 1A depicts a system overview according to various embodiments of the present invention. FIG. 1B depicts a system overview for training the classifier according to various embodiments of the present invention. FIG. 2 depicts a method of classifying images according to various embodiments of the present invention.

Referring to FIGS. 1A, 1B, and 2, in various embodiments, the Mura detection system receives an input image at a preprocessor 100 (200). The input image may, for example, include an image of a display that is showing a test image. A camera may be used to generate a test image by taking a picture of the OLED displaying a test image. In various embodiments, the test image may include an image that is likely to cause a display to exhibit instances of white spot Mura. For example, the test image may be a uniform image exhibiting low levels of contrast. The input image may also be of high enough resolution to show the individual pixels of the display being inspected for defects (e.g. white spot Mura). In various embodiments, the preprocessor 100 may be configured to receive the input image and perform smoothing to reduce the noise in the image. After reducing the noise in the input image, the preprocessor 100 may be configured to divide the image into a plurality of image patches (210). Each of the image patches may then be supplied to a feature extractor 110.

In various embodiments, the feature extractor 110 is configured to calculate various statistical features for a supplied image patch (220). For example, the statistical features may include one or more image moments (e.g. a weighted average of pixels' intensities) and one or more texture measurements (e.g. texture analysis using a Gray-Level Co-Occurance Matrix (GLCM)). For example, in various embodiments, 37 statistical features including various image moments and GLCM texture features are extracted by the feature extractor 110. In various embodiments, the feature extractor 110 may be configured to calculate mu 30 moments (3rd order centroid moments), contrast (GLCM), Hu 5 moments (Hu moments), Hu 1 moments (1st Hu invariant moment), and correlation/dissimilarity (GLCM) for each image patch.

In various embodiments, the statistical features of each image patch extracted are supplied as input to the classifier 120 (230). In various embodiments, the classifier 120 is a machine learning classifier that uses the extracted features (e.g. a feature vector) and label class information to identify instances of defects (e.g. Mura) (240). In various embodiments, the class information is supplied by training the classifier.

In various embodiments, the classifier utilizes a supervised learning model and therefore is trained before being functional. In some embodiments, the supervised learning model used in the classifier 120 is a support vector machine. The supervised learning model (e.g. the support vector machine) may be trained by providing human input 130 to the classifier 120 during the training phase. For example, for each image patch, a human may visually inspect the patch and mark any instances of white spot Mura. The image patches are also provided to the feature extractor 110. The feature vector extracted for the image patch and the corresponding human inspected and marked patch are both provided to the classifier 120. The classifier 120 utilizes these provided patches to generate class information (i.e. builds a model) for later use in classification.

Figure 3:
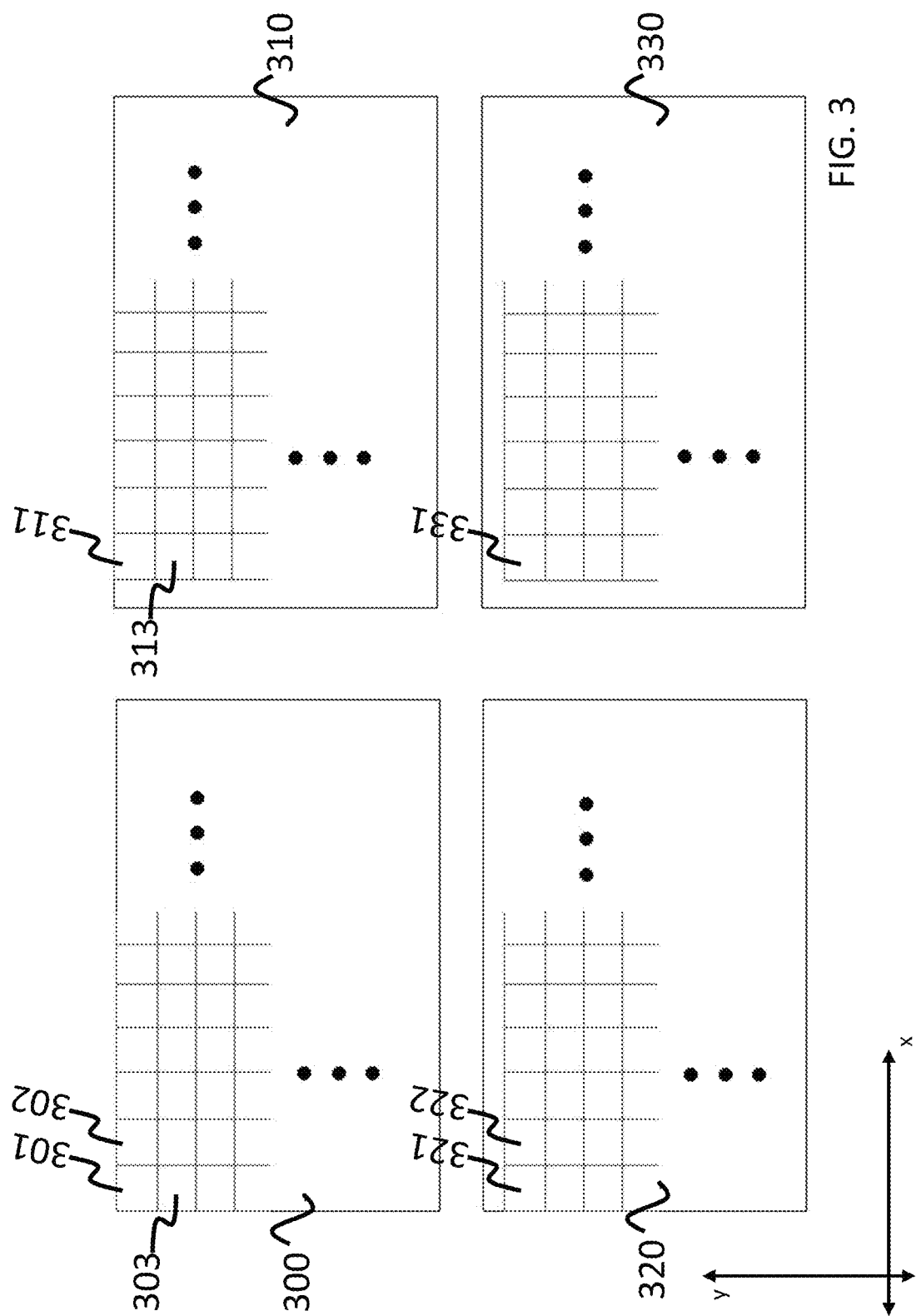
FIG. 3 depicts an dividing an image into image patches according to various embodiments of the present invention.

FIG. 3 depicts an dividing an image into image patches according to various embodiments of the present invention.

Referring to FIG. 3, in various embodiments, the white spot Mura detection system may divide an input image into a plurality of image patches 301-333. In various embodiments, the input image includes a relatively high resolution image of a display. For example, the display may have a QHD (2560×1440) resolution and the input image may include a high enough resolution to depict the individual pixels of the QHD display. In various embodiments, the preprocessor may divide the input image into 32 display pixel by 32 display pixel patches (e.g. the patches include an image depicting 1024 total pixels from the display). In some embodiments, the patches may use a sliding window method that includes overlapping patches. For example, the image patches may overlap by any number of pixels (e.g. the patches may overlap by sliding a single pixel, two pixels etc.). For example, FIG. 3 includes patches that half-overlap in two directions (e.g. an x-direction and a y-direction). In each example, the image patches are slid in the x-direction and/or the y-direction to produce a new set of overlapping patches. For example, a first set of patches 300 includes 32 pixel by 32 pixel non-overlapping image patches that cover the entire input image. The first set of patches 300 includes the patch 301 in the upper left corner of the input image, the patch 302 is directly to the right of the patch 301 and the patch 303 directly below the patch 301. A second set of patches 310 half-overlaps the first set of patches in the x-direction (e.g. the second set of patches are shifted to the right 16 pixels). For example, the patch 311 is shifted 16 pixels in the x-direction (e.g. to the right) from the patch 301 and half-overlaps the patches 301 and 302.

A third set of patches 320 have been shifted down by 16 pixels and half-overlap the first set of patches 300. For example, the patch 321 is shifted 16 pixels down (e.g. in the y-direction) relative to the patch 301 and half-overlaps the patches 301 and 303. The fourth set of patches 330 is shifted down 16 pixels relative to the second set of patches 310. Thus, the patch 331 half-overlaps the patches 311 and 312. The patch 331 also half over-laps the patches 321 and 322.

Utilizing half-overlapping image patches covering the entire input image may be inefficient due to the large number of image patches created. The large number of patches is particularly cumbersome for training purposes since a supervised learning model may have human input for each image patch. Additionally, sometimes the image patches yield defects along the periphery of a patch. Having patches that include the defect centered in each patch may be preferable for more reliable classification.

Figure 4:
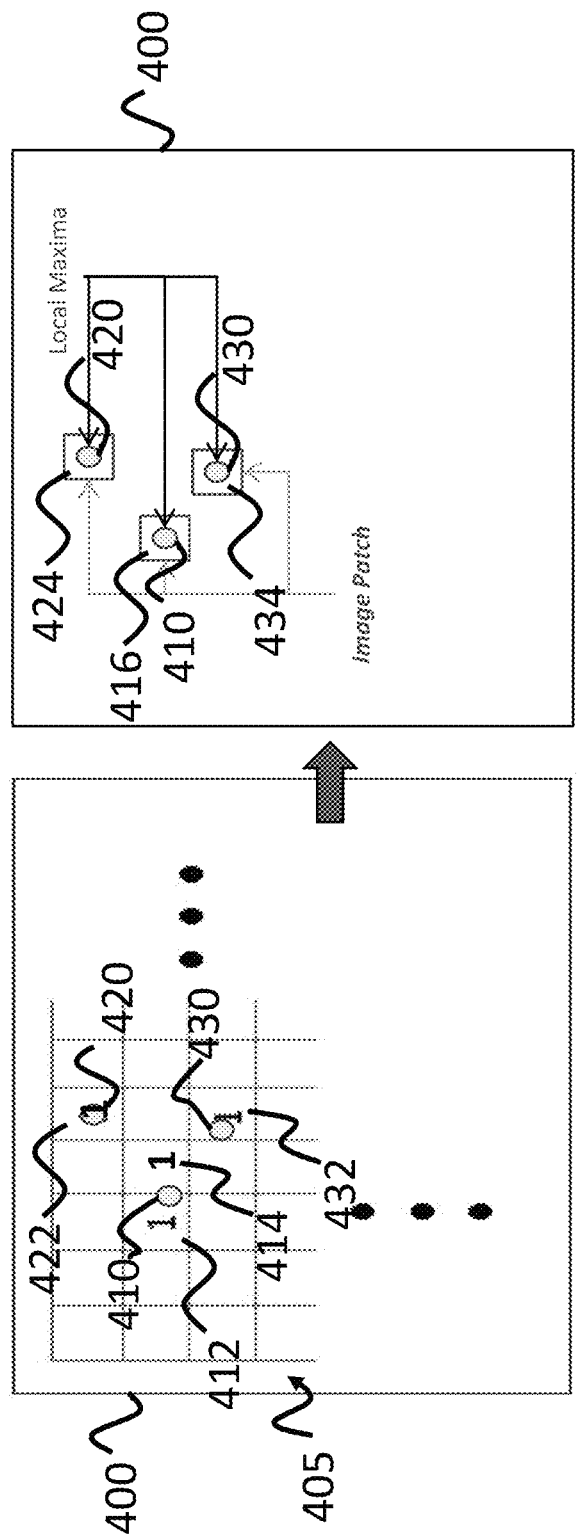
FIG. 4 depicts dividing an image into image patches utilizing a candidate detector according to various embodiments of the present invention.

FIG. 4 depicts dividing an image into image patches utilizing a candidate detector according to various embodiments of the present invention.

Referring to FIG. 4, in various embodiments, an input image 400 may be divided into a plurality image patches using a Mura candidate detector. For example, in various embodiments, the input image 400 may include one or more instances of white spot Mura 410, 420, 430. In the embodiment described above with respect to FIG. 3, a plurality of patches 405 covering the entire input image 400 would be generated. In some cases, the instances of white spot Mura may be located near the edge or overlapping an edge of one or more image patches. For example, a first instances of white spot Mura 410 is located at the edge of the image patches 412 and 414 (both marked 1 to show an instance of white spot Mura). A second instance of white spot Mura 430 is located at the edge of the image patch 432. In this example, a third instance of white spot Mura 420 is located near the center of the image patch 422. In some cases, image patches with instances of spot Mura located towards the side of an image patch may have different statistical model features than cases of white spot Mura located in the center of an image patch. Thus, a machine learning model may need to be trained to identify each edge case to be effective. Training the model to identify each edge case may be time intensive and require a large amount of human supervision for a supervised machine learning model. Furthermore, using a sliding method to generate image patches may produce a very large number of image patches which requires higher processing time for classification. Thus, to reduce training and processing time, while increasing accuracy, a spot Mura candidate detector may be utilized.

Figure 5A:
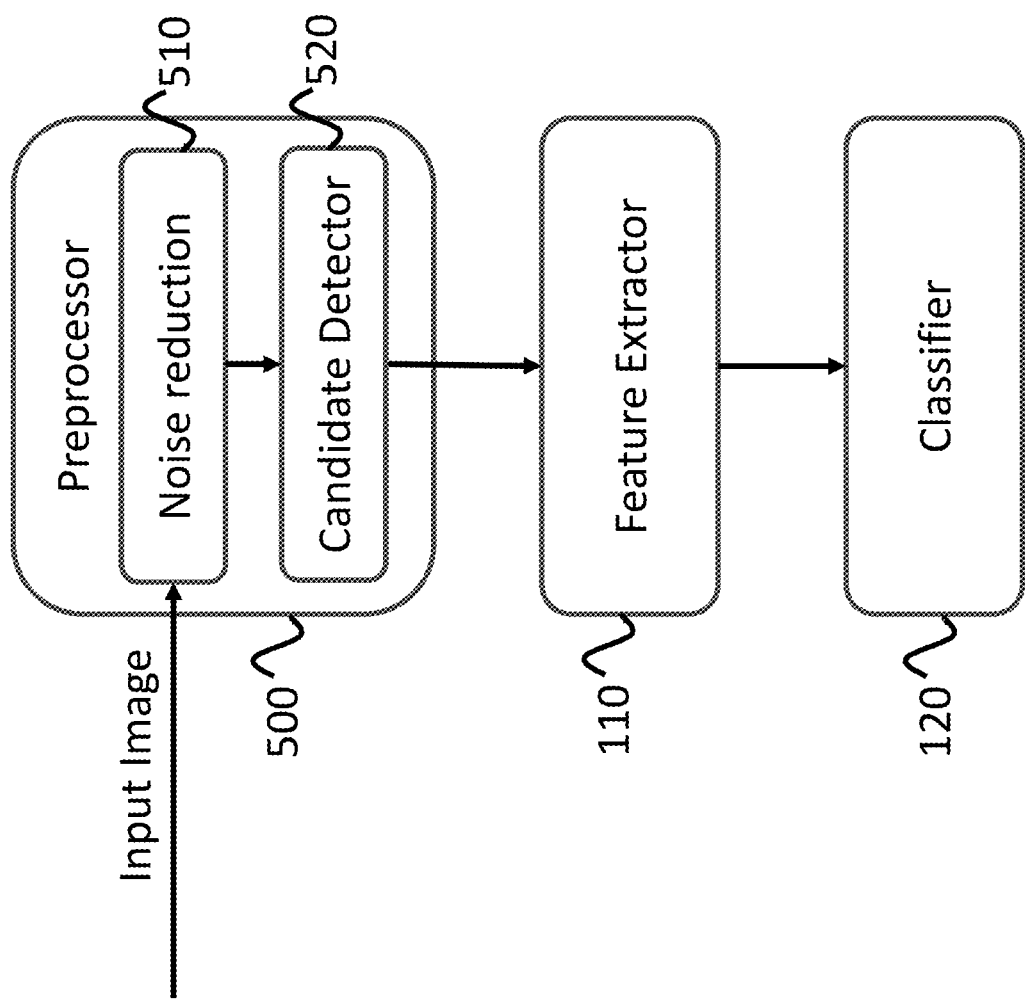
FIG. 5A depicts a system overview having a candidate detector according to various embodiments of the present invention.
Figure 5B:
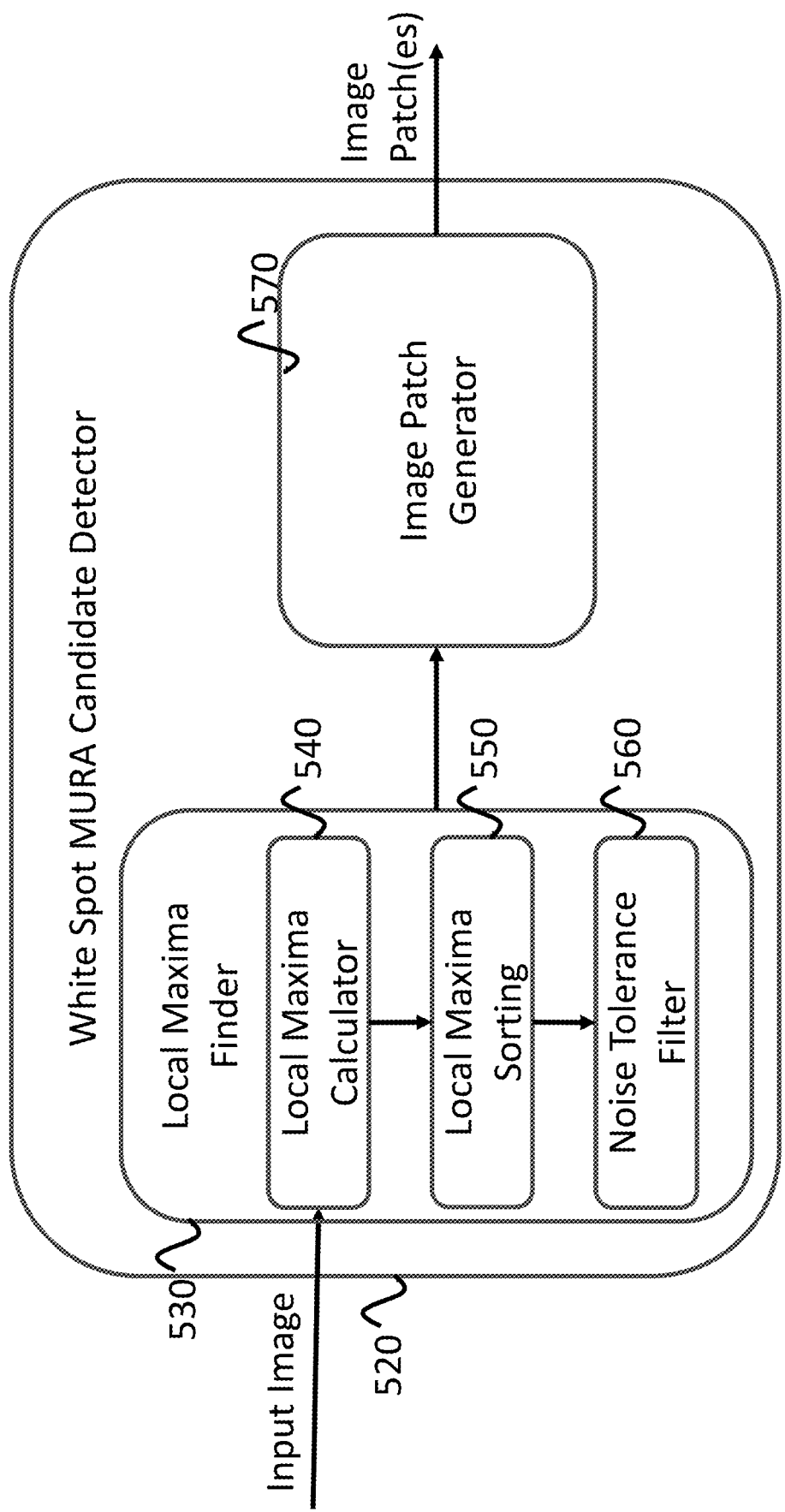
FIG. 5B depicts a more detailed view of a candidate detector according to various embodiments of the present invention.
Figure 6:
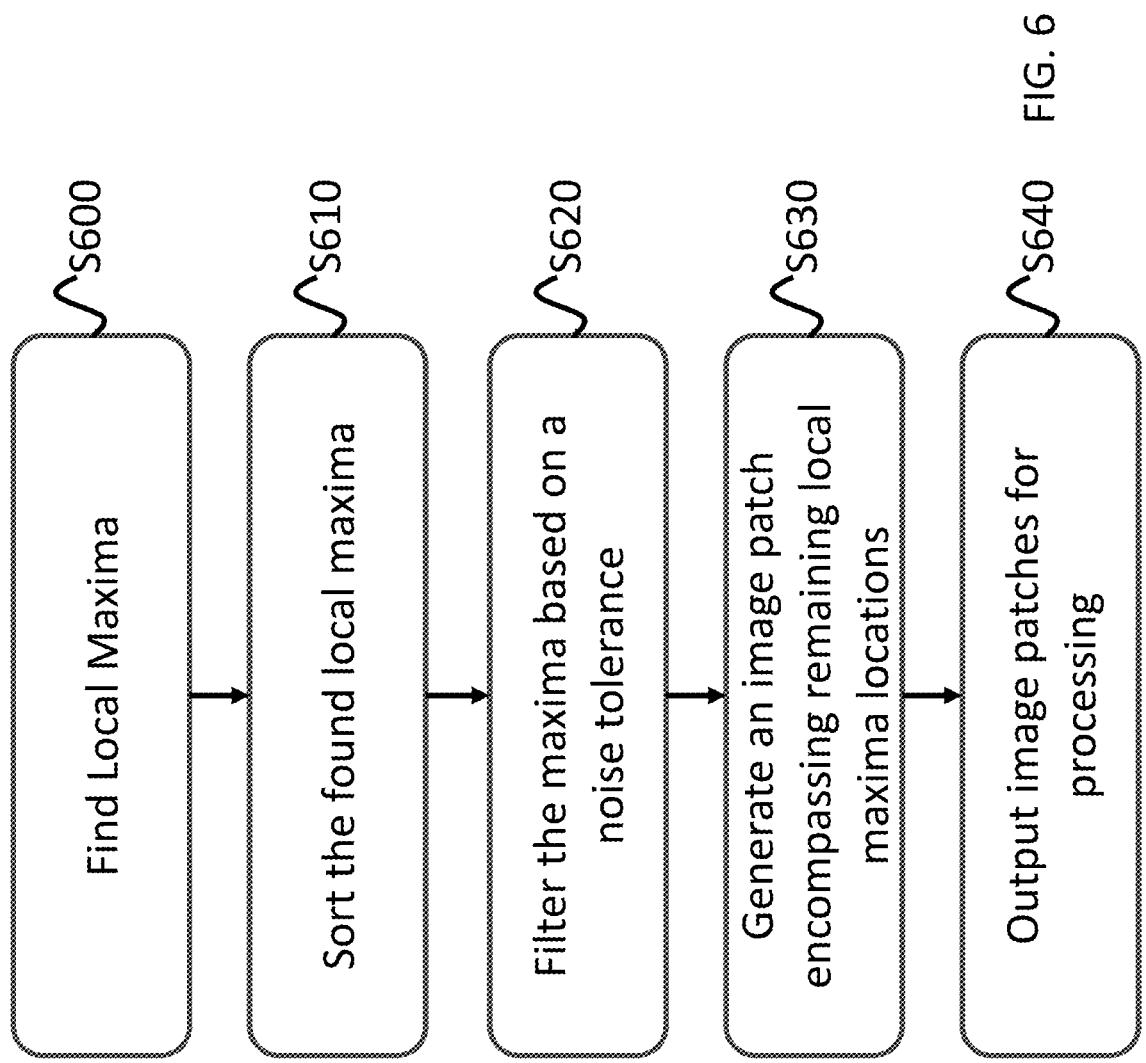
FIG. 6 depicts a method of identifying potential instances (e.g. candidates) of spot Mura according to various embodiments of the present invention.

In various embodiments, a spot Mura candidate detector is utilized to identify potential instances of spot Mura and generate image patches with the potential instances of spot Mura at the center of the image patches. For example, instead of splitting the entire input image 400 into a relatively large number of patches 405, the spot Mura candidate detector may be configured to identify potential instances of spot Mura and generate patches at the locations of those potential instances. For example, the instances or potential instances of spot Mura 410, 420, and 430 may be identified by the spot Mura candidate detector and the image patches 416, 424, and 434 may be generated to include the instances or potential instances of spot Mura as will be described in further detail with respect to FIGS. 5A and 5B. In various embodiments, using the spot Mura candidate detector may reduce the overall system processing time due to the reduction in the number of image patches sent to the classifier. Furthermore, the reduction in total image patches may also reduce training time when compared to the sliding window method described FIG. 5A depicts a system overview having a candidate detector according to various embodiments of the present invention. FIG. 5B depicts a more detailed view of a candidate detector according to various embodiments of the present invention. FIG. 6 depicts a method of identifying potential instances (e.g. candidates) of spot Mura according to various embodiments of the present invention.

Referring to FIG. 5A, in various embodiments, the system may include a preprocessor 500 configured for defect candidate detection. In various embodiments, the preprocessor 500 includes a noise reducer 510 and a candidate detector 520. In various embodiments, the noise reducer 510 may perform Gaussian smoothing to reduce the noise of the input image. The noise reducer 510 may also normalize the input image by mapping the image's dynamic range to an expected dynamic range. For example, in various embodiments the noise reducer 510 may perform linear normalization, non-linear normalization, or normalization may be done using standard deviation.

After the input image has been smoothed and normalized, the candidate detector 520 may identify potential defect candidates and generate an image patch with the candidate at the center. In various embodiments, the candidate detector 520 may identify local maxima and create a list of local maxima locations.

Referring to FIG. 5B, in various embodiments, the spot Mura candidate detector 520 may include a local maxima finder 530 and an image patch generator 570. In various embodiments, the local maxima finder 530 is configured to located potential instances of white spot Mura (e.g. a candidate) and provide the location (e.g. the center of the potential instance of white spot Mura) to the image patch generator 570. In various embodiments, the image patch generator 570 receives the candidate's location and generates an image patch around the location for use in classification.

In various embodiments, the local maxima finder includes a local maxima calculator 540. The local maxima calculator 540 is configured to identify each local maxima in the input image (S600). In various embodiments, the local maxima calculator 540 is configured to analyze either the entire input image or portions of the input image to create a list of local maxima candidate locations (e.g. the center locations of each local maxima). In some examples, the local maxima calculator 540 may be configured to iterate through the input image and identify the location of a maximum brightness within a predefined area. For example, if the system utilizes 32 pixel by 32 pixel image patches for use in classification, the local maxima calculator 540 may be configured to identify a maxima (e.g. a point with the highest brightness within the area) within each 32×32 pixel area of the input image.

In various embodiments, the list of local maxima may be provided for local maxima sorting 550. In various embodiments, the local maxima sorting 550 is configured sort the local maxima list by value (e.g. brightness) (S610). The sorted local maxima list may then be provided to the noise filter 560. In various embodiments, the noise filter 560 is configured to remove any local maxima candidates from the local maxima list that fall below a noise tolerance level (S620). For example, a noise tolerance threshold may be configured such that when a local maxima does not stand out from the surroundings by more than the noise tolerance threshold (e.g. is brighter than the surrounding area), the local maxima is rejected. For example, the threshold for whether a maxima is accepted as a candidate may be set at the maxima (e.g. maximum value for the area) minus the noise threshold and the contiguous area around the maxima may be analyzed. For example, in various embodiments, a flood fill algorithm may be used to identify each maxima above the noise tolerance threshold and identify each maxima for a given area (e.g. in some embodiments, only one maxima for an area may be allowed).

In various embodiments, the list of local maxima locations may be provided to the image patch generator 570 which then generates image patches each with a sport Mura candidates (e.g. the filtered local maxima) located at the relative center of the image patch (S630). The image patches may then be output for feature extraction and classification (S640).

Accordingly, the above described embodiments of the present disclosure provide a system and method for identifying instances of Mura on a display panel.

The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. A system for identifying Mura in a display, the system comprising:
   a memory;
   a processor configured to execute instructions stored on the memory that, when executed by the processor, cause the processor to:
   pre-process an input image, wherein pre-processing an input image comprises generating a plurality of image patches by identifying at least one local maxima candidate in the input image and generating an image patch for each of the at least one local maxima candidate;
   extract a feature vector for each of the plurality of image patches, wherein the feature vector comprises at least one image moment feature and at least one texture feature;
   classify each image patch based on a presence of a defect by providing the feature vector for each image patch to a machine learning classifier,
   wherein generating a plurality of image patches further comprises:
      adding each identified local maxima candidate to a candidate list; and
      generating an image patch for each local maxima in the candidate list, and
   wherein each image patch is centered corresponding to the corresponding local maxima candidate.

2. The system of claim 1, wherein each image patch is centered at the corresponding local maxima candidate.

3. The system of claim 2, wherein generating a plurality of image patches further comprises filtering local maxima candidates in the candidate list by removing each local maxima candidate from the candidate list when the local maxima candidate has a value less than a noise tolerance threshold.

4. The system of claim 3, wherein generating a plurality of image patches further comprises:
   dividing the input image into a plurality of areas;
   identifying a maximum local maxima in each area of the plurality of areas; and
   removing all local maxima from the local maxima list except for each maximum local maxima.

5. The system of claim 1, wherein the machine learning classifier comprises a support vector machine.

6. The system of claim 1, wherein the at least one texture feature comprises at least one of a correlation Gray-Level Co-Occurrence Matrix (GLCM) or a contrast GLCM.

7. The system of claim 1, wherein the at least one image moment comprises at least one of a mu 30 moment, hu 1 moment, or a hu 5 moment.

8. The system of claim 1, wherein pre-process an input image further comprises performing Gaussian smoothing on the input image and normalizing the smoothed input image by mapping a dynamic range of the smoothed input image to an expected range.

9. The system of claim 1, wherein the defect comprises white spot Mura.

10. A method for identifying Mura in a display, the method comprising:
    pre-processing an input image, by a processor, wherein pre-processing the input image comprises generating a plurality of image patches by identifying at least one local maxima candidate in the input image and generating an image patch for each of the at least one local maxima candidate;
    extracting a feature vector, by a processor, for each of the plurality of image patches, wherein the feature vector comprises at least one image moment feature and at least one texture feature;
    classifying each image patch based on a presence of a defect by providing the feature vector for each image patch to a machine learning classifier,
    wherein generating a plurality of image patches further comprises:
       adding each identified local maxima candidate to a candidate list; and
       generating an image patch for each local maxima in the candidate list, and
    wherein each image patch is centered corresponding to the corresponding local maxima candidate.

11. The system of claim 10, wherein each image patch is centered at the corresponding local maxima candidate.

12. The system of claim 11, wherein generating a plurality of image patches further comprises filtering local maxima candidates in the candidate list by removing each local maxima candidate from the candidate list when the local maxima candidate has a value less than a noise tolerance threshold.

13. The system of claim 12, wherein generating a plurality of image patches further comprises:
    dividing the input image into a plurality of areas;
    identifying a maximum local maxima in each area of the plurality of areas; and
    removing all local maxima from the local maxima list except for each maximum local maxima.

14. The system of claim 10, wherein the machine learning classifier comprises a support vector machine.

15. The system of claim 10, wherein the at least one texture feature comprises at least one of a correlation Gray-Level Co-Occurrence Matrix (GLCM) or a contrast GLCM.

16. The system of claim 10, wherein the at least one image moment comprises at least one of a mu 30 moment, hu 1 moment, or a hu 5 moment.

17. The system of claim 10, wherein pre-processing an input image further comprises performing Gaussian smoothing on the input image and normalizing the smoothed input image by mapping a dynamic range of the smoothed input image to an expected range.

18. The system of claim 10, wherein the defect comprises white spot Mura.

19. A method for identifying Mura in a display, the method comprising:
    pre-processing an input image, by a processor, wherein pre-processing the input image comprises generating a plurality of image patches, wherein generating a plurality of image patches comprises:
       identifying at least one local maxima candidate in the input image;

adding each identified local maxima candidate to a candidate list; and generating an image patch for each local maxima in the candidate list, wherein each image patch is centered corresponding to the corresponding local maxima candidate;

extracting a feature vector, by a processor, for each of the plurality of image patches, wherein the feature vector comprises at least one image moment feature and at least one texture feature;

classifying each image patch, by a processor, based on a presence of a white spot Mura defect by providing the feature vector for each image patch to a support vector machine.

20. The method of claim 19, wherein the at least one texture feature comprises at least one of a correlation Gray-Level Co-Occurrence Matrix (GLCM) or a contrast GLCM and the at least one image moment comprises at least one of a mu 30 moment, hu 1 moment, or a hu 5 moment.

21. A white spot MURA candidate detector comprising:

a local maxima finder configured to identifying at least one local maxima candidate in an input image, the local maxima finder comprising:

a local maxima calculator configured to identify each local maxima in the input image and add each local maxima to a candidate list;

a local maxima sorter configured to sort the local maxima list by a value; and a noise tolerance filter configured to remove any local maxima from the candidate list below a noise tolerance level; and an image patch generator configured to generating an image patch for each local maxima in the candidate list, wherein each image patch is centered at the corresponding local maxima candidate.

* * * * *